United States Patent [19]

Jezwinski et al.

[11] Patent Number: 5,621,517
[45] Date of Patent: Apr. 15, 1997

[54] METHOD AND APPARATUS FOR TESTING FIBER OPTIC TELEPHONE LINES

[75] Inventors: Scott D. Jezwinski, Buffalo Grove; Douglas L. Jones, Champaign, both of Ill.

[73] Assignee: Teradyne, Inc., Boston, Mass.

[21] Appl. No.: 434,873

[22] Filed: May 2, 1995

[51] Int. Cl.$^6$ ................................................ G01N 21/88
[52] U.S. Cl. ................................................ 356/73.1
[58] Field of Search ........................................ 356/73.1

[56] References Cited

U.S. PATENT DOCUMENTS 5,221,839  6/1993  Braun ........................... 250/227.24
5,251,001  10/1993  Dave et al. ........................ 356/73.1

OTHER PUBLICATIONS

BellCore, TA-NWT-000196 Generic Requirements for Optical Time Domain Reflectometers (OTDRs).
BellCore, TA-TSY-001028 Generic Criteria for Optical Continuous Wave Reflectometers.
Hewlett-Packard Journal, "A Modular All-Haul Optical Time-Domain Reflectometer for Characterizing Fiber Links," Feb. 1993.
Hewlett-Packard Journal, "A High-Speed Optical Time-Domain Reflectometer with Improved Dynamic Range," Dec. 1988.

*Primary Examiner*—Vincent P. McGraw
*Attorney, Agent, or Firm*—Edmund J. Walsh

[57] ABSTRACT

An optical fiber test unit and a method of operating it. The test unit has a laser with a computer controlled excitation current input. To take a measurement, the laser is turned on for a period of time which is approximately equal to twice the propagation time through the fiber. The laser is then turned off and the reflected signal is recorded. This signal is displayed and contains discontinuities which indicate discontinuities in the fiber. The unit provides good dynamic range, but is able to make measurements more rapidly than a conventional OTDR. It is therefore well suited for scan testing of fiber optic cable bundles.

27 Claims, 3 Drawing Sheets

METHOD AND APPARATUS FOR TESTING FIBER OPTIC TELEPHONE LINES

This invention relates generally to testing optical fibers and more particularly to testing fiber optic telephone lines.

Optical fibers are widely used to carry large amounts of digital data. They have very fast data rates and generally very low attenuation. For many years, optical fibers have been used in trunk lines of telephone networks. Trunk lines carry data from one central office, or switch, to another. The large amounts of data which must be carried in the trunk lines and the long distances over which the data must be carried made fiber optics highly desirable.

More recently, there has been a growing trend towards using fiber in the "subscriber loop." The subscriber loop is the portion of the telephone network which connects the telephone in each telephone subscriber's premise to the switch. There is an increasing demand for more data in all forms to be carried directly to subscribers, such as for providing interactive video services.

Currently, the bulk of all subscribers connect to the subscriber loop through a twisted pair of copper wires. However, when optical fiber is used in the subscriber loop, these copper wires run to an optical network unit or ONU. The ONU converts light signals on the optical fiber into voltages carried on the copper wires and vice-versa.

Generally, an optical fiber leaving a central office runs to splitter. The splitter divides the light at its input, usually equally, and routes it into several other optical fibers. Each of the optical fibers branching from the splitter is terminated with an ONU. In this way, information leaving the switch is distributed to numerous points where it can be easily routed to subscribers over the copper wires.

One challenge in using optical fiber in the subscriber loop is that of testing the fiber to detect and locate faults. Optical fiber has traditionally been tested through a technique called optical time domain reflectometry, or OTDR. With OTDR, a narrow pulse of light is injected into one end of the fiber. As the pulse travels down the optical fiber, a small amount of light is sent back to the source as a result of a phenomenon known as Rayleigh scattering. The amount of light which is sent back towards the source is measured over time.

The pulse is attenuated as it travels down the fiber and, in a perfectly uniform fiber, should decrease in amplitude exponentially. As a result, the amount of light scattered back towards the source should also decrease exponentially as the pulse travels down the fiber. An OTDR displays the magnitude of light which is sent back on a logarithmic scale and a uniform fiber produces a trace which falls off at a constant rate. The rate at which the reflections fall off is an indication of the attenuation purity of the fiber. This information is useful in controlling the manufacturing process when the fiber is made.

Certain types of discontinuities in the fiber block some or all of the pulse from traveling further down the fiber. Such a discontinuity causes an abrupt decrease in the reflected light. Other types of discontinuities cause additional light to be reflected back towards the source. Thus, discontinuities often appear on the OTDR trace as steps, bumps or spikes. For this reason, the OTDR is useful in identifying fibers with discontinuities.

In addition to indicating the presence of a discontinuity, the distance from the start of the fiber to the discontinuity may also be determined from the OTDR trace. The light pulse travels through the fiber at a constant rate. The amount of time it takes for the pulse to reach the discontinuity and reflect back to the source is directly proportional to the distance between the source and the discontinuity.

The OTDR has been used to detect and locate discontinuities in fiber in the subscriber loop. However, testing fiber in the loop presents challenges not found in other applications. In particular, the presence of optical splitters results in extremely large losses in the network. To accurately measure the signals generated during the OTDR test of a fiber in the subscriber loop, the OTDR equipment must have a very large dynamic range. As the incident pulse passes down the fiber, the reflections get smaller and smaller. If the dynamic range of the OTDR equipment is too small, it will not accurately measure reflections from the ends of the fiber.

To make the situation worse, each discontinuity in the fiber reduces the signal strength, requiring more dynamic range from the OTDR in order to see reflected signal all the way to the end of the fiber. The subscriber loop has many discontinuities. Discontinuities arise because of splitters and similar circuitry which are necessary in a subscriber loop. In addition, the subscriber loop is often formed by joining several short lengths of fiber, which generates a discontinuity.

OTDR equipment with 36 dB of dynamic range is often used to test fibers in subscriber loops. While greater dynamic range would, in many cases, be desirable, 36 dB is near the upper limit of an OTDR that can be economically produced with available technology.

Several techniques are used to improve the dynamic range of an OTDR without making the equipment prohibitively expensive. One way to increase dynamic range is to reduce the noise in the OTDR equipment. Averaging returns from several pulses reduces noise. However, averaging returns increases the measurement time. One telephone industry standard limits the measurement time to three minutes, which limits the amount of improvement in dynamic range which can be achieved through averaging. Also, averaging only eliminates gaussian-type noise. The effectiveness of averaging is also limited by a non-gaussian noise floor.

A second approach to increasing dynamic range is to increase the power in the incident pulse. The power may be increased by increasing the amplitude or the duration of the pulse. However, each of these options has limits. The resolution of the OTDR equipment is limited by the width of the pulse. Commercially available equipment generally is limited to produce pulses which are less than 20 μsec in duration to provide adequate resolution. It is generally accepted that, at least for determining dynamic range, the incident pulse should have a width of 10 μsec.

In some instances, an OTDR trace of a fiber is made by piecing together segments of traces made using different pulse widths. Each segment is made by averaging reflections from several pulses. For segments representing the near end portions of the fiber, a narrow pulse width is used to get good resolution. For segments representing the far end portions of the fiber, a wider pulse is used to provide the higher power levels. This technique is called multiple pulse width acquisition and, depending on the specific fiber, can provide higher dynamic range without losing resolution in the area of the fiber where higher resolution is important. However, the technique has the disadvantage of being slow because of the multiple acquisitions involved. It also is does not provide good resolution at the far end of the fiber.

Incident power can also be increased by increasing the amplitude of the input pulse. However, commercially available lasers suitable for use in OTDR generally have a limited output amplitude. Lasers which produce larger amplitude pulses are much more expensive.

Today, OTDR units which have in excess of 36 dB of dynamic range cost significantly more than OTDR units having 20 dB or less of dynamic range. There is therefore a great need for a low cost way to accurately test optical fiber in subscriber loops of telephone networks.

Another technique used for testing optical fiber is called optical continuous wave reflectometry, or OCWR. In this technique, a continuous light signal is input into a fiber. The power level of the input signal is either known or measured. The total reflected power from the fiber is then measured. The reflected power may be measured once or computed by averaging several samples. The ratio of the reflected to input power, in dB, is called the ORL and is reported by the OCWR device.

OCWR devices generally require careful calibration and are predominately used in a laboratory setting. They are generally ill suited for use in a field environment. Further, as the output of the OCWR is the ORL, it is not useful in localizing faults.

SUMMARY OF THE INVENTION

With the foregoing background in mind, it is an object to provide a low cost way to accurately test optical fiber.

It is also an object to provide a way to provide a fiber test unit which can test optical fibers in the subscriber loop of a telephone network.

The foregoing and other objects are achieved in a test unit having a laser. The excitation current to the laser may be turned on for long periods of time. In the preferred embodiment of the invention, the laser is turned on for a time which exceeds the back and forth propagation time from one end of the fiber to the other. The laser is then turned off and the light returning from the fiber is measured and displayed as a function of time. Discontinuities in the fiber are detected by discontinuities in the trace made by plotting the light returning from the fiber as a function of time.

In one embodiment, the rate of change of the light leaving the fiber is displayed.

In yet another embodiment, the excitation current to the laser is computer controlled and can be selected to be on for a long period of time or can be pulsed to make a conventional OTDR measurement.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
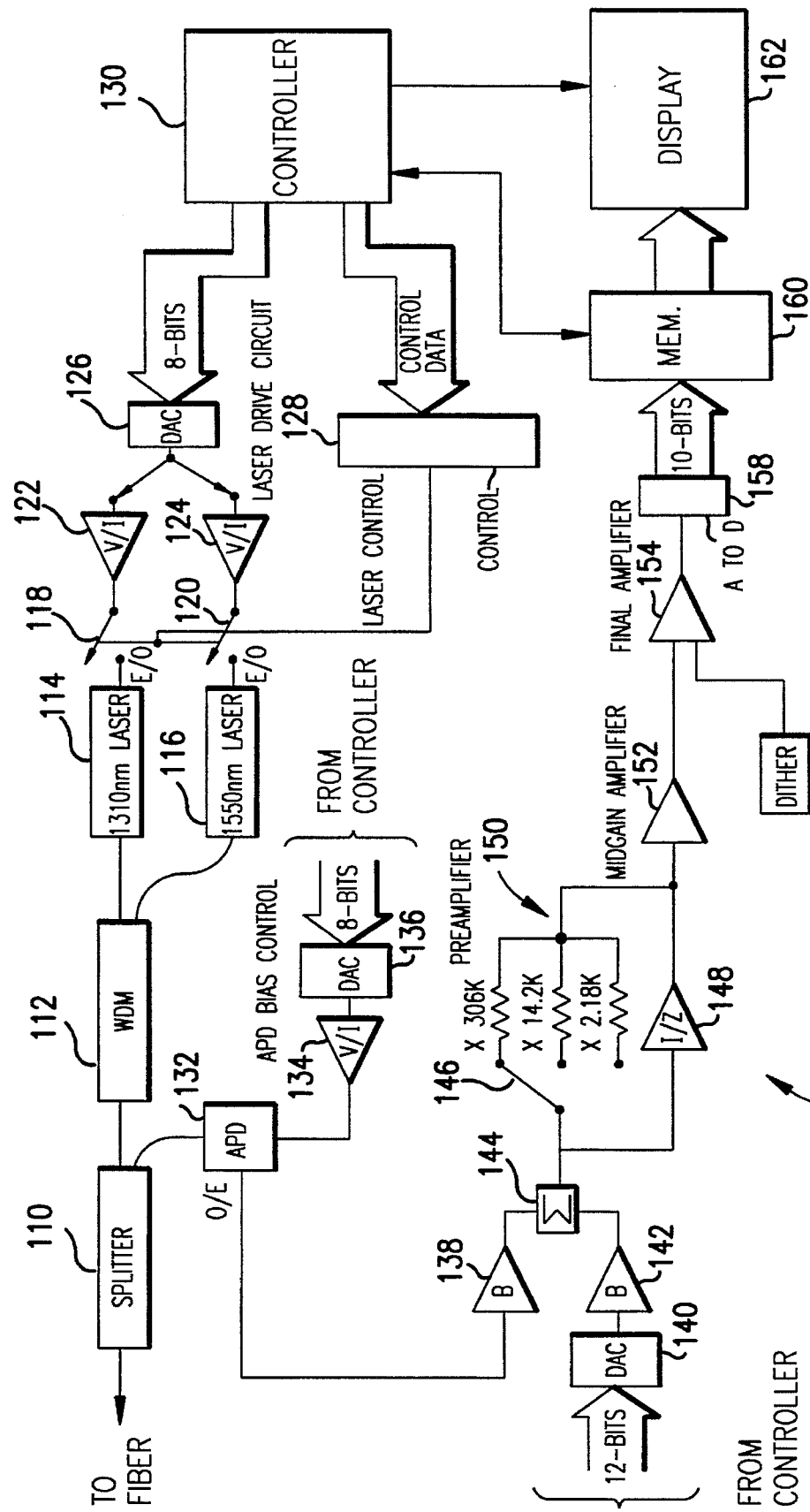
FIG. 1 is a block diagram of an optical fiber test instrument according to the invention.

FIG. 1 shows a fiber test instrument 100 according to the invention.

Test instrument 100 contains two lasers 114 and 116. As in a conventional optical time domain reflectometry (OTDR) system, the lasers are of different wavelengths. Preferably, 1310 nm and 1550 nm lasers are used because these are standard wavelengths used in telephone networks, but the number and frequency of the lasers is not critical to the invention. Lasers in this frequency range are commercially available from several sources, such as NEC.

The laser light is fed to combiner 112 and then passed to splitter 110. Combiner 112 is a wavelength division multiplexer (WDM). Splitter 110 is a directional element which passes the light from lasers 114 and 116 to a fiber (not shown) connected to test instrument 100. Reflections from the fiber (not shown) are routed to detector 132 and processed in a manner to be described in greater detail below.

Lasers 114 and 116 generate light when an excitation current is applied to them. In test instrument 100, the excitation current is derived under control of controller 130.

Controller 130 is preferably implemented with a commercially available microprocessor. It is programmed with a control program described in greater detail in conjunction with FIG. 2, below. Controller 130 also includes support circuitry conventionally found in microprocessor systems such as ROM for program storage and busses and bus controllers.

Controller 130 generates digital signals which are passed to digital-to-analog converter (DAC) 126. DAC 126 converts the digital signal into an analog voltage. The analog voltage is supplied to amplifiers 122 and 124. Amplifiers 122 and 124 produce an output current which is proportional to the digital output of controller 130. This current is provided as the excitation current to lasers 114 and 116.

By changing the value provided to DAC 126, controller 130 can change the amplitude of the light produced by lasers 114 and 116. The values provided to DAC 126 can be rapidly changed to produce light pulses as are conventionally emitted by an OTDR. The width (duration) of the pulses can also be controlled. Conversely, by keeping the value provided to DAC 126 constant, a continuous beam of light can be produced. The amplitude of the continuous beam can be modulated, if desired, by changing the values provided to DAC 126.

Control circuit 128 receives control data from controller 130. In response to the control data, control circuit 128 generates commands which close or open switches 118 and 120. Switches 118 and 120 selectively connect lasers 122 and 124, respectively, to combiner 112. In this way either one or both of the lasers may be used.

Light reflected in the fiber under test (not shown) is routed back through splitter 110 to detector 132. Detector 132 is preferably an avalanche photodiode. However, other detectors could also be used.

Detector 132 is biased by a current supplied by amplifier 134. The magnitude of that current is controlled by the output of DAC 136 which receives a control input from controller 130. Detector 132 is biased as known in the art.

The signal output of detector 132 is passed to buffer amplifier 138. The output of buffer amplifier 138 is passed to summer 144.

Summer 144 combines the signal out of detector 132 with an offset generated by DAC 140 under control of controller 130. The offset from DAC 140 is similarly buffered by buffer amplifier 142 before it is input to summer 144.

The output of summer 144 is provided as an input to preamplifier 148. Preamplifier 148 is connected to a resistor network 150 through switch 146. The position of switch 146 controls the gain of preamplifier 148. As in a conventional OTDR unit, this gain is adjustable.

The reflected signal, after preamplification is passed to midgain amplifier 152 and then to final amplifier 154. Final amplifier 154 receives an input from dither circuit 156, which is added to the signal representing reflected light. Dither circuit 156 produces a dither signal to increase the resolution of the analog to digital conversion, in accordance with known techniques.

Multiple stages of amplification are provided as is customary in the electronics industry to provide as large a signal to noise level as possible.

The output of final amplifier 154 is provided to analog-to-digital converter (ADC) 158. ADC 158 converts the reflected signal into digital form. In the preferred embodiment, digital samples are produced at a 25 MHz rate.

The digital samples of the reflected signal are passed to memory 160. Memory 160 is a 32k×24 bit RAM operating at a speed of 20 nsec.

The samples are read back from memory 160 and displayed on display 162. Display 162 is any graphical display customarily used in electronic instruments. It could be a CRT. Circuitry used to display a stream of data in graphical form is well known and is not shown in detail.

The sample values stored in memory 160 are optionally processed by controller 130. Controller 130 could scale the sample values to be displayed in a convenient size on display 162. Alternatively, they could be scaled to fit on a logarithmic scale. If averaging is used, controller 130 temporally averages the samples stored in memory 160 after several measurements before display. Controller 130 may also optionally display the first derivative with respect to time of the samples stored in memory.

Figure 2:
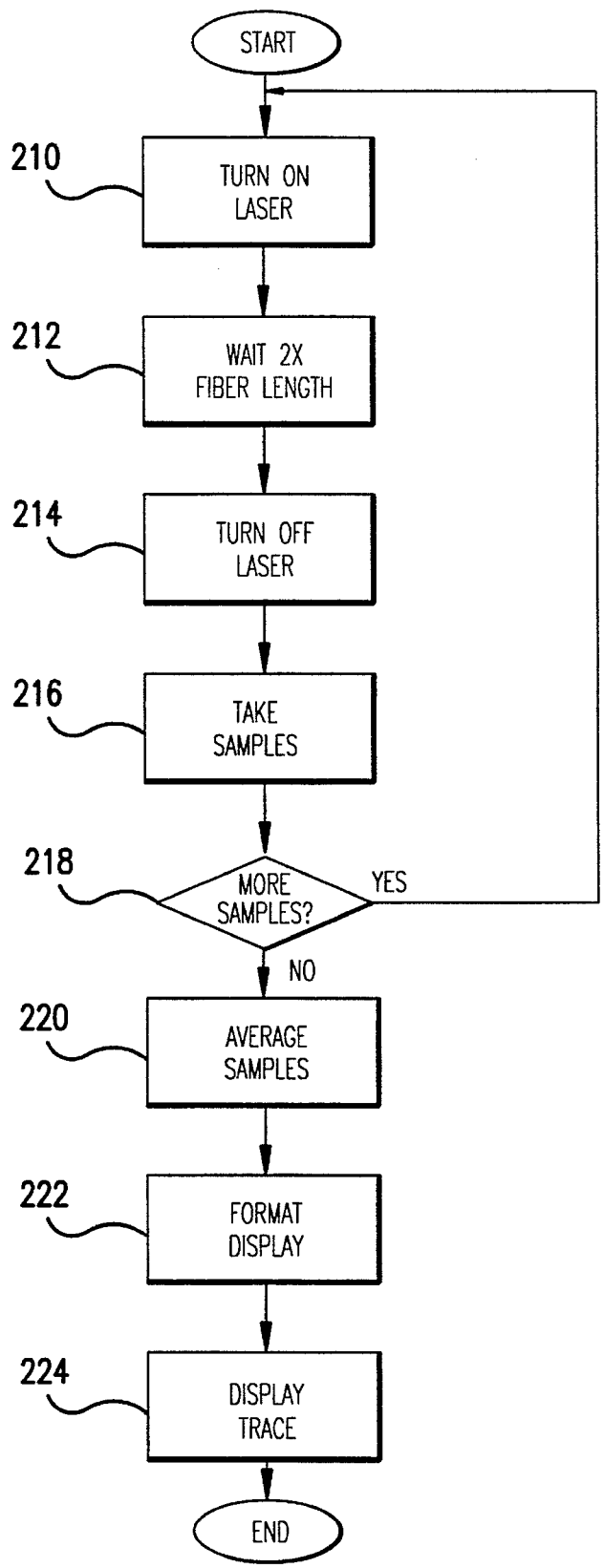
FIG. 2 is a flow chart depicting operation of the control system according to the invention.

Turning now to FIG. 2, a flow chart of the operation of fiber test instrument 100 is shown. A test is initiated by a user input to controller 130. Any convenient input device (not shown) could be connected to controller 130. For example, a keyboard could be used. Alternatively, a smaller number of switches or knobs could be included. Regardless of the type of input device used, the user activates the input device after test unit 100 is connected to the fiber to be tested (not shown). Various operating parameters might also be specified by the user, such as the gain for preamplifier 148. Generally, a user does not specify operating parameters directly. Rather, the user inputs information about the fiber being tested, such as the length. Controller 130 can convert such input specifications into operating parameters. For example, when a long fiber length is specified, a higher gain is used. Test unit 100 should be configured prior to taking measurements.

Once a test is initiated, execution proceeds to step 210. At step 210, the lasers in test unit 100 are turned on and execution proceeds to step 212.

At step 212, controller 130 waits until the lasers have been turned on for a length of time which is preferably twice the length of the fiber. Fiber lengths are sometimes expressed in units of length such as feet or kilometers. Alternatively, the fiber length can be described in units of time, representing the time it takes for a light pulse to travel down the fiber. Conversely, times can be expressed in units of time, such as nanoseconds or units of length, representing the length of the fiber through which the pulse travels in that time. Though the relationship between distance and time depends on the refractive index of the fiber, a fiber length of 1 meter is roughly equivalent to a time of 5 nsec.

In some OTDR units, the user inputs the length of the fiber. This allows the OTDR unit to compute the smallest possible pulse width which will still produce reflections from the end of the fiber. The same scheme could be used with the invention. Alternatively, the laser could be turned on for some fixed period of time which is greater than twice the length of the longest fiber the unit could test.

Execution then proceeds to step 214. At step 214, the lasers are turned off. Execution proceeds immediately to step 216 where sampling of the reflected signal is begun. Samples of the reflected signal are stored in memory 160. The sampling should last for at least twice the fiber length, as in a conventional OTDR. This time represents the length of time it takes for light at the beginning of the fiber to travel to the end and for any reflections from that light to propagate back to the beginning. This time might be measured or might be recognized when the value of the reflected signal drops significantly, indicating that no further reflected signals will be received. The collected signals represent one sample set.

Once the samples for one sample set have been collected, execution proceeds to step 218. Step 218 is a decision block at which a determination is made as to whether samples for additional sample sets should be collected. Sample sets could be collected for a set amount of time, such as one minute. Alternatively, sample sets could be collected for a fixed amount of iterations through the loop starting at step 210. As another variation, the signal to noise ratio of the reflected signals might be measured. Sample sets might be taken and averaged until the signal to noise ratio of the averaged sample set drops to an acceptable level. Where measurement time is dictated by signal to noise level, it might be necessary to set some upper bound on the time spent making the measurements.

Once the required number of sample sets have been collected, the samples are averaged at step 220. Each iteration through the loop starting at step 210 collects one sample set. The sample sets are averaged point by point, producing a single sample set representing an average reflected signal. Alternatively, sample averaging can be performed as the samples are taken rather than after all samples have been collected. In this way, a running average is stored in memory 160 rather than multiple sample sets.

At step 222, the averaged sample set is optionally formatted for display. The step of formatting could include translating the magnitude of each sample onto a logarithmic scale. The magnitude or time base of the signal might also be scaled, as in a conventional OTDR unit, for easier display. Other formatting techniques providing a user friendly display might optionally be employed. For example, information describing a grid or graph labels might also be added to the data prior for display.

Additionally, formatting step 222 might include computing the derivative of the average sample set for display. The derivative of the sample set will produce a display with spikes that highlight discontinuities.

At step 224, the formatted trace is displayed.

EXAMPLE

Figure 3:
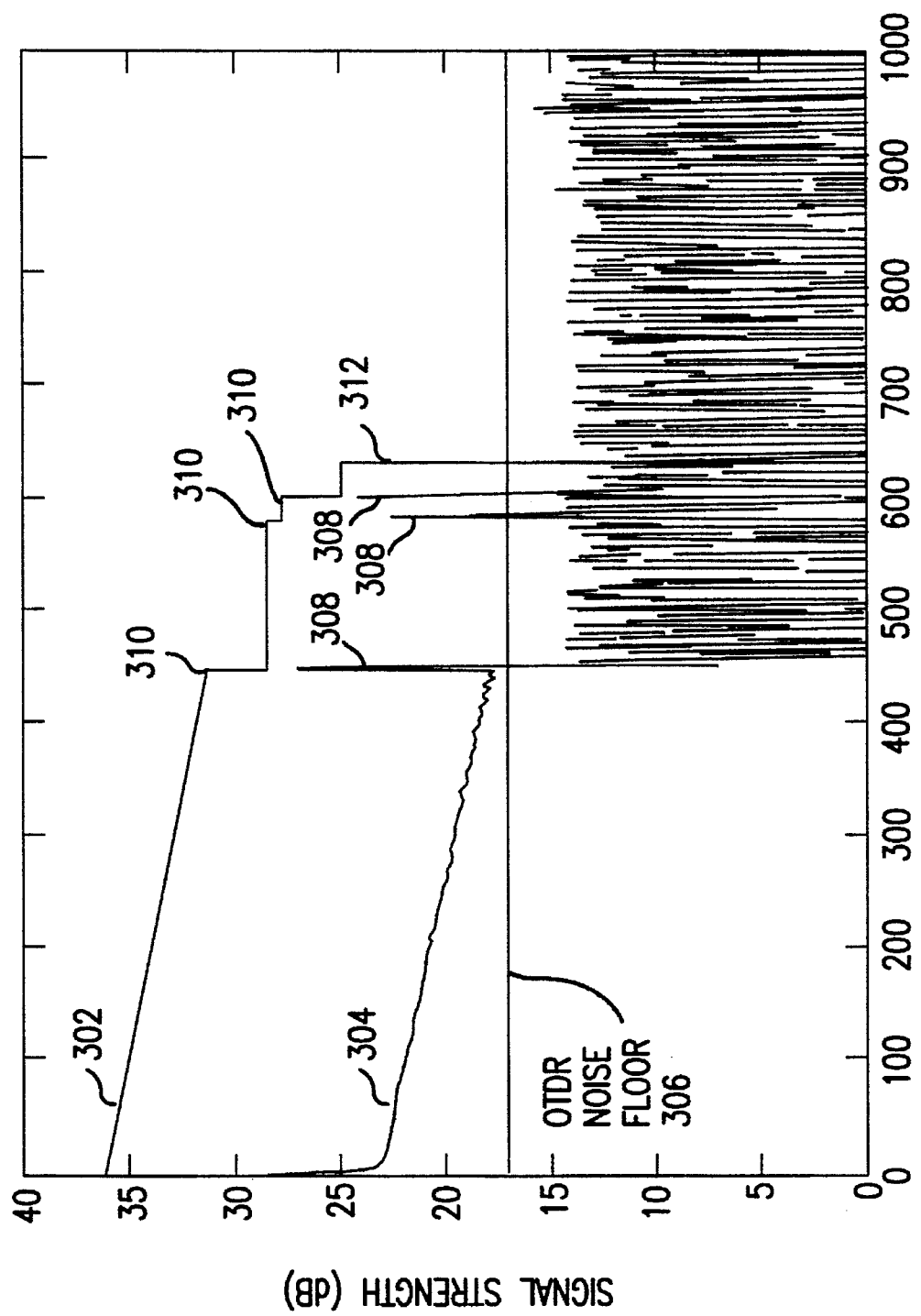
FIG. 3 is a graph comparing traces made according to the invention and made with conventional OTDR processing.

FIG. 3 shows two traces made with the measurement unit of FIG. 1. Trace 302 is made using the method of FIG. 2. Trace 304 is made by operating the hardware of FIG. 1 to make a standard OTDR measurement.

Trace 304 contains approximately 15 dB of noise which establishes a noise floor around 17 dB. Unless a reflection exceeds 17 dB, it can not be reliably differentiated from noise. Trace 304 contains three spikes 308 which indicate discontinuities in the fiber under test.

Trace 302, made by the technique of the invention, contains three steps 310 which correspond to the spikes 308. The steps 310 indicate discontinuities in the fiber. In addition, trace 302 contains an additional step 312 which indicates the end of the fiber.

Trace 302 was made without any averaging, whereas trace 304 was made using 40 nsec pulses with 45 seconds of averaging. FIG. 3 illustrates that the technique of the invention can provide comparable or superior dynamic range in a shorter measurement time than a traditional OTDR unit.

Having described one embodiment, numerous alternative embodiments or variations might be made. For example, FIG. 1 shows that a combination of two lasers are used to provide the input signal. The invention will work with any number of lasers at any frequencies.

Also, FIG. 1 shows that the invention is used in a measurement instrument. The reduced test times achievable with the invention make it possible to rapidly test numerous fibers. Each fiber might be tested in less than 40 seconds and could be tested as quickly as within 5 seconds. The invention might be beneficially used in a network scanner which is attached to a fiber network. It repeatedly tests, or scans, fibers in the network and detects faults in those fibers. Such a system could be implemented by programming controller 130 with analysis software as described in my copending patent application Ser. No. 08/210,315 for Method And Apparatus For Scanning A Fiber Optic Network (which is hereby incorporated by reference). Alternatively, a separate processor could be used. Accordingly, use of the invention is not restricted to a stand alone instrument.

The invention might be particularly useful in conjunction with a telephone network test system. When used in such a system, the trace might not be immediately displayed for a human to interpret. Rather, the stored data might be stored for further analysis to detect faults in the network before a result is displayed. Also, it is not necessary that the trace be displayed graphically. It might, for example, be displayed in a table or other useful format.

Also, though, the invention is particularly useful for economically providing the dynamic range needed to test the subscriber loops of telephone networks, its use is not so limited. It may be used with any type of fiber network, including point to point fibers and point to multipoint networks.

Further, it was described above that discontinuities in a fiber under test might be identified by steps in the trace made by the invention. Other features of the trace might also be used to identify features of the fiber. For example, if the fiber under test contains a region which provides attenuation without reflection, a step might not be observed in the trace. Rather, the slope of the trace would change. Thus, it might be desirable to also detect changes in slope of the trace made according to the invention.

FIG. 2 shows that at step 212 the measurement unit turns the laser on for twice the length of the fiber. It should be appreciated that the laser need not be on for exactly this time. If the laser is on for slightly longer, the output will be the same but the measurement time is increased. If the laser is on for slightly less time, the signal to noise level decreases slightly but useful information is still obtained.

Further, it was described that the laser light was turned off before reflections from the fiber are measured. In use, the measurement instrument is connected to a fiber at a connector. A relatively high level of light passing through this connector will be reflected back and could saturate the light receiving portions of the instrument. Some connectors are specially made not to reflect light back to its source. Such connectors are called angle polished connectors or APC. If such a connector were used, reflected light could be measured even before the laser were turned off.

Further, it was described that the traces made according to the invention are sometimes differentiated to highlight discontinuities. The window size (i.e. the number of consecutive samples processed at one time) used for the differentiation will influence the resolution of the resulting trace. Smaller windows result in higher resolution. The traces made according to the invention can be differentiated using windows of different size. A small window can be used in areas where greater resolution is required. A larger window can be used in other areas. In this way, a trace resembling a conventions multiple pulse width acquisition can be generated. However, the need to take multiple measurements at different pulse widths is avoided.

Further, it should be noted that the only input described was a step function of light. The light is turned on and maintains a constant amplitude until it is turned off. Other inputs might be used. For example, the amplitude of the light might increase linearly with time. A trace equivalent to that generated with a step input could be computed by differentiation. A trace with peaks like an OTDR could be obtained by taking the second derivative of the trace.

Also in FIG. 2, it was described that sample sets were averaged at step 220 after all sample sets were taken. As successive sample sets are taken, they could be averaged with previously stored values. The values stored in memory would thus represent a running average of sample sets rather than multiple sample sets. Such an arrangement might be preferred as it reduces the total amount of memory needed to store data. Additionally, the samples might be boxcar averaged to improve signal to noise ratio. Additionally, a moving average could be computed to further improve the signal to noise ratio.

Also, it was described that the display was formatted by changing the values stored in memory. Not all formatting needs to be accomplished after samples are taken. Final amplifier 154 might be a logarithmic amplifier, which would eliminate the need to reformat the samples to display them on a logarithmic scale. An analog logarithmic amplifier might be preferred for some cases because it reduces the required dynamic range of ADC 158 and memory 160.

In view of the foregoing, the invention should not be limited by the presently disclosed embodiment but only by the spirit and scope of the appended claims.

What is claimed is:

1. A fiber test unit for testing a fiber having a length, comprising:

a) a laser having a control input and a light output;

b) a splitter having an input coupled to the light output of the laser, a first output coupled to a fiber under test, and a second output for directing light reflected from the fiber;

c) a light detector having a light input and an electronic output, with the light input connected to the second output of the splitter;

d) a user interface coupled to the electronic output of the light detector; and e) control means for:
  i) turning on the laser for a period of time greater than the time recquired for light to travel twice the length of the fiber, and
  ii) turning off the laser and displaying a signal representing the electronic output of the light detector.

2. The fiber test unit of claim 1 wherein the control means comprises means for turning on the laser for a period of time at least as long as the time required for light to travel twice the length of the fiber.

3. The fiber test unit of claim 1 wherein the control means comprises means for turning on the laser for a period of time about as long as the time required for light to travel twice the length of the fiber.

4. The fiber test unit of claim 1 further comprising an analog-to-digital converter coupled to the light detector through at least one amplifier, and a memory coupled to the analog-to-digital converter for storing the output of the analog-to-digital converter, wherein the user interface is coupled to the light detector through at least another amplifier.

5. The fiber test unit of claim 1 wherein the control means comprises a microprocessor executing a program.

6. The fiber test unit of claim 1 wherein the control means additionally comprises:

a) means for turning on and off the laser to produce a pulse having a width of less than 20 microseconds;

b) means for displaying a signal representing the electronic output of the light detector; and c) input means for receiving a command specifying whether the laser is to be turned on for a period of time greater than the time required for light to travel the length of the fiber, or whether the laser is to be a pulse.

7. A method of testing an optical fiber, comprising the steps of:

a) injecting light in the fiber for a period of time exceeding the time required for light to travel the length of the fiber;

b) measuring light reflected from the fiber; and c) storing as a function of time the magnitude of the reflected light received during an interval exceeding the time required for light to travel the length of the fiber.

8. The method of claim 7 wherein the step of injecting light ends prior to the step of measuring light.

9. The method of claim 7 additionally comprising the step of displaying the stored magnitude of the reflected light in graphical form on a logarithmic scale.

10. The method of claim 7 additionally comprising the step of displaying the derivative with respect to time of the stored magnitude of the reflected light.

11. The method of claim 7 wherein the step of injecting light comprises injecting light for a period of time approximately equal to the time required for light to travel twice the length of the fiber, and the step of measuring comprises measuring for a period of time approximately equal to the time required for light to travel twice the length of the fiber.

12. The method of claim 11 additionally comprising repeating the steps of injecting and measuring a plurality of times and the step of displaying includes displaying the average value of the reflected light.

13. The method of claim 7 wherein the step of injecting light comprises injecting light for a period of time in excess of 20 microseconds.

14. The method of claim 13 wherein the step of injecting light comprises injecting light for a period of time in excess of 50 microseconds.

15. The method of claim 7 wherein the step of injecting light comprises the steps of:

a) connecting a laser to the fiber; and b) turning on the laser.

16. The method of claim 7 additionally comprising the steps of:

a) identifying a step discontinuity in the stored data; and b) indicating the location of a fault in the fiber based on the time at which the discontinuity occurred.

17. The method of claim 7 additionally comprising:

a) repeating the step of injecting and measuring;

b) averaging the measured information in the repeated step with the stored information and storing the average.

18. The method of testing an optical fiber of claim 17 additionally comprising the steps of:

a) computing the signal to noise ratio of the average measured information;

b) comparing the computed signal to noise ratio to a predetermined threshold; and c) repeating steps a) and b) of claim 17 when the computed signal to noise ratio is below the threshold.

19. A method of testing optical fiber in a subscriber loop of a telephone network using the method of claim 7, the method comprising the steps of:

a) attaching a test unit incorporating a laser to a fiber in a subscriber loop; and b) performing the steps of claim 7.

20. The method of claim 7 additionally comprising the steps of:

a) identifying a change in slope in the stored data; and b) indicating the location of a fault in the fiber based on the time at which the change in slope occurred.

21. The method of claim 7 wherein the step of injecting light in the fiber comprises injecting light with an amplitude linearly increasing over time.

22. The method of claim 7 additionally comprising the step of differentiating the stored magnitude of the reflected light, with the differentiation operation being performed using a first window size for a first portion of the stored data and using a second window size for a second portion of the stored data.

23. The method of claim 7 wherein the step of measuring begins before the step of injecting light ends.

24. A method of testing a plurality of optical fibers in a cable bundle, comprising the steps of:

a) selecting a first fiber in the bundle;

b) injecting laser light into the selected fiber for a period of time exceeding 20 microseconds;

c) turning off the laser;

d) measuring the light reflected from the fiber;

e) processing the reflected light to check for faults in the selected fiber; and f) selecting a different fiber in the bundle and repeating steps b) through e).

25. The method of claim 24 wherein the time between the step of selecting a first fiber and the start of the step of processing is less than 40 seconds.

26. The method of claim 25 wherein the time between the step of selecting a first fiber and the start of the step of processing is less than 5 seconds.

27. The method of claim 24 wherein the step of injecting laser light comprises injecting laser light for a period of time exceeding 50 microseconds.

* * * * *